(12) United States Patent
Berry

(10) Patent No.: US 10,711,620 B1
(45) Date of Patent: Jul. 14, 2020

(54) INSERT SYSTEM FOR AN AIRFOIL AND METHOD OF INSTALLING SAME

(71) Applicant: General Electric Company, Schenectady, NY (US)

(72) Inventor: Jonathan Dwight Berry, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 25 days.

(21) Appl. No.: 16/247,348

(22) Filed: Jan. 14, 2019

(51) Int. Cl.
*F01D 5/18* (2006.01)
*F01D 9/04* (2006.01)

(52) U.S. Cl.
CPC .............. *F01D 5/189* (2013.01); *F01D 9/041* (2013.01); *F05D 2230/60* (2013.01); *F05D 2240/126* (2013.01); *F05D 2240/301* (2013.01); *F05D 2240/304* (2013.01); *F05D 2260/201* (2013.01)

(58) Field of Classification Search
None
See application file for complete search history.

(56) References Cited

U.S. PATENT DOCUMENTS

| | | | |
|---|---|---|---|
| 3,301,527 A * | 1/1967 | Kercher | F01D 5/189 415/115 |
| 5,207,556 A | 5/1993 | Frederick et al. | |
| 5,634,766 A * | 6/1997 | Cunha | F01D 5/187 415/115 |
| 6,019,572 A * | 2/2000 | Cunha | F01D 5/187 415/114 |
| 6,283,708 B1 * | 9/2001 | Zelesky | F01D 5/189 416/97 R |
| 6,431,824 B2 * | 8/2002 | Schotsch | F01D 9/02 415/115 |
| 6,607,355 B2 | 8/2003 | Cunha et al. | |
| 6,742,984 B1 * | 6/2004 | Itzel | F01D 5/189 29/889.722 |
| 7,946,815 B2 * | 5/2011 | Liang | F01D 5/186 416/97 R |
| 8,393,867 B2 * | 3/2013 | Chon | F01D 5/188 416/1 |
| 10,415,428 B2 * | 9/2019 | Spangler | F01D 25/12 |
| 2002/0085910 A1 * | 7/2002 | Burdgick | F01D 5/188 415/116 |

(Continued)

FOREIGN PATENT DOCUMENTS

EP   2573325   3/2013

*Primary Examiner* — Michael Lebentritt
(74) *Attorney, Agent, or Firm* — Armstrong Teasdale LLP

(57) ABSTRACT

An insert system for an airfoil is provided. The airfoil includes a plenum that extends into an aft portion of the airfoil. The plenum includes a plenum inlet and an entirety of the plenum inlet is defined axially forward of the aft portion. The insert system includes a first and second insert. The first insert and the second insert include a plurality of impingement openings defined therein. The first insert includes a first neck portion. The first insert is sized for insertion into the plenum radially through the plenum inlet and the first insert is movable aftward within the plenum into an installed position such that the first neck portion is positioned aftward in the plenum inlet. The second insert is sized for insertion into the plenum radially through the plenum inlet forward of the first neck portion in the installed position.

20 Claims, 7 Drawing Sheets

(56) References Cited

U.S. PATENT DOCUMENTS

| | | | | |
|---|---|---|---|---|
| 2002/0090294 | A1* | 7/2002 | Keith | F01D 5/189 |
| | | | | 415/115 |
| 2003/0026689 | A1* | 2/2003 | Burdgick | F01D 5/186 |
| | | | | 415/115 |
| 2003/0068222 | A1* | 4/2003 | Cunha | F01D 5/18 |
| | | | | 415/115 |
| 2010/0054932 | A1* | 3/2010 | Schiavo | F01D 5/147 |
| | | | | 415/200 |
| 2013/0156549 | A1* | 6/2013 | Maldonado | F01D 5/189 |
| | | | | 415/115 |
| 2014/0079540 | A1* | 3/2014 | Morris | B22F 5/04 |
| | | | | 415/178 |
| 2014/0341723 | A1* | 11/2014 | Bourassa | F01D 9/065 |
| | | | | 415/175 |
| 2016/0023275 | A1* | 1/2016 | Propheter-Hinckley | |
| | | | | B22F 3/1055 |
| | | | | 416/96 A |
| 2016/0201487 | A1* | 7/2016 | Spangler | F01D 25/12 |
| | | | | 415/115 |
| 2017/0198602 | A1* | 7/2017 | Hernandez | F01D 9/041 |
| 2017/0234151 | A1* | 8/2017 | Spangler | F01D 5/188 |
| | | | | 415/115 |
| 2017/0234154 | A1* | 8/2017 | Downs | F01D 5/189 |
| | | | | 415/177 |
| 2017/0356341 | A1* | 12/2017 | Dutta | F01D 5/189 |
| 2018/0094527 | A1* | 4/2018 | Halfmann | F01D 5/081 |
| 2018/0163553 | A1* | 6/2018 | Ozarslan | F01D 9/065 |
| 2019/0323362 | A1* | 10/2019 | Arisi | F01D 25/12 |

\* cited by examiner

INSERT SYSTEM FOR AN AIRFOIL AND METHOD OF INSTALLING SAME

FEDERAL RESEARCH STATEMENT

This invention was made with Government support under contract number Contract No. DE-FE0023965 awarded by the Department of Energy (DOE). The government has certain rights in this invention.

BACKGROUND

The field of the disclosure relates generally to cooling of airfoils and, more specifically, to inserts for impingement cooling of rotary machine components.

In at least some known rotary machines, energy is extracted from a gas stream in a turbine which powers a mechanical load. During operation of the rotary machine, various hot gas path components are subjected to the high-temperature gas stream, which can induce wear in the hot gas path components. For example, air is pressurized in a compressor and mixed with fuel in a combustor for generating the stream of high-temperature gases. Generally, higher temperature gases increase performance, efficiency, and power output of the rotary machine. Thus, at least some known hot gas path components are cooled to facilitate operation of the rotary machine with the increased high-temperature gas streams. However, higher temperature gases can also increase thermal stresses and/or thermal degradation of the rotary machine components.

Some known hot gas path components include an airfoil with an internal cooling system, wherein a cooling fluid, such as bleed air extracted from a compressor or steam, is forced through plenums defined within the airfoil. This forced cooling facilitates the hot gas path components functioning in the high-temperature gas stream. At least some known plenums include an inlet opening and integrated components or inserts with a plurality of impingement openings. These components or inserts allow the cooling fluid channeled into the plenum through the plenum inlet opening to be directed by the impingement openings to impingement upon the internal surfaces of the airfoil, thus increasing the cooling of the internal components of the airfoil. However, at least some known integrated components with impingement openings cannot be easily replaced, because removal and replacement of some known integrated components would require disassembly and/or replacement of the entire airfoil. Additionally, at least some known removable inserts have a limited range for insertion depth into the plenum, as they are constrained by the dimensions of the inlet opening of the plenum. As such, these inserts may not provide for effective impingement cooling of the internal surfaces of some portions of the airfoil.

BRIEF DESCRIPTION

In one aspect, an insert system for an airfoil is provided. The airfoil includes a plenum that extends into an aft portion of the airfoil. The plenum includes a plenum inlet. An entirety of the plenum inlet is defined axially forward of the aft portion. The insert system includes a first insert and a second insert. The first insert includes a first neck portion. The first insert is sized for insertion into the plenum radially through the plenum inlet, and the first insert is movable aftward within the plenum into an installed position such that the first neck portion is positioned aftward in the plenum inlet. The second insert is sized for insertion into the plenum radially through the plenum inlet forward of the first neck portion in the installed position. The first insert and the second insert further include a plurality of impingement openings defined therein.

In another aspect, a gas turbine system is provided. The gas turbine system includes a compressor section, a combustion section, and a turbine section. The combustion system is coupled in flow communication with the compressor section. The turbine section is coupled in flow communication with the combustion system. The turbine section includes an airfoil, a first insert, and a second insert. The airfoil includes a plenum that extends into an aft portion of the airfoil. The plenum includes a plenum inlet. An entirety of the plenum inlet is defined axially forward of the aft portion. The first insert is positioned within the plenum and includes a first main body portion extending into the aft portion, and a first neck portion positioned aftward in the plenum inlet. The second insert is positioned within the plenum forward of the first insert and includes a second neck portion positioned in the plenum inlet forward of the first neck portion. The first insert and the second insert further include a plurality of impingement openings defined therein.

In another aspect, a method of installing an insert system into an airfoil is provided. The airfoil includes a plenum that extends into an aft portion of the airfoil. The plenum includes a plenum inlet. An entirety of the plenum inlet is defined axially forward of the aft portion. The method includes inserting a first insert through the plenum inlet into the plenum. The first insert includes a first neck portion and a first main body portion. The method also includes moving the first insert aftward within the plenum into an installed position such that the first neck portion is positioned aftward in the plenum inlet and the first main body portion extends into the aft portion. The method further includes inserting a second insert into the plenum radially through the plenum inlet forward of the first neck portion. The first insert and the second insert include a plurality of impingement openings defined therein.

DRAWINGS

These and other features, aspects, and advantages of the present disclosure will become better understood when the following detailed description is read with reference to the accompanying drawings in which like characters represent like parts throughout the drawings, wherein.

Figure 1:
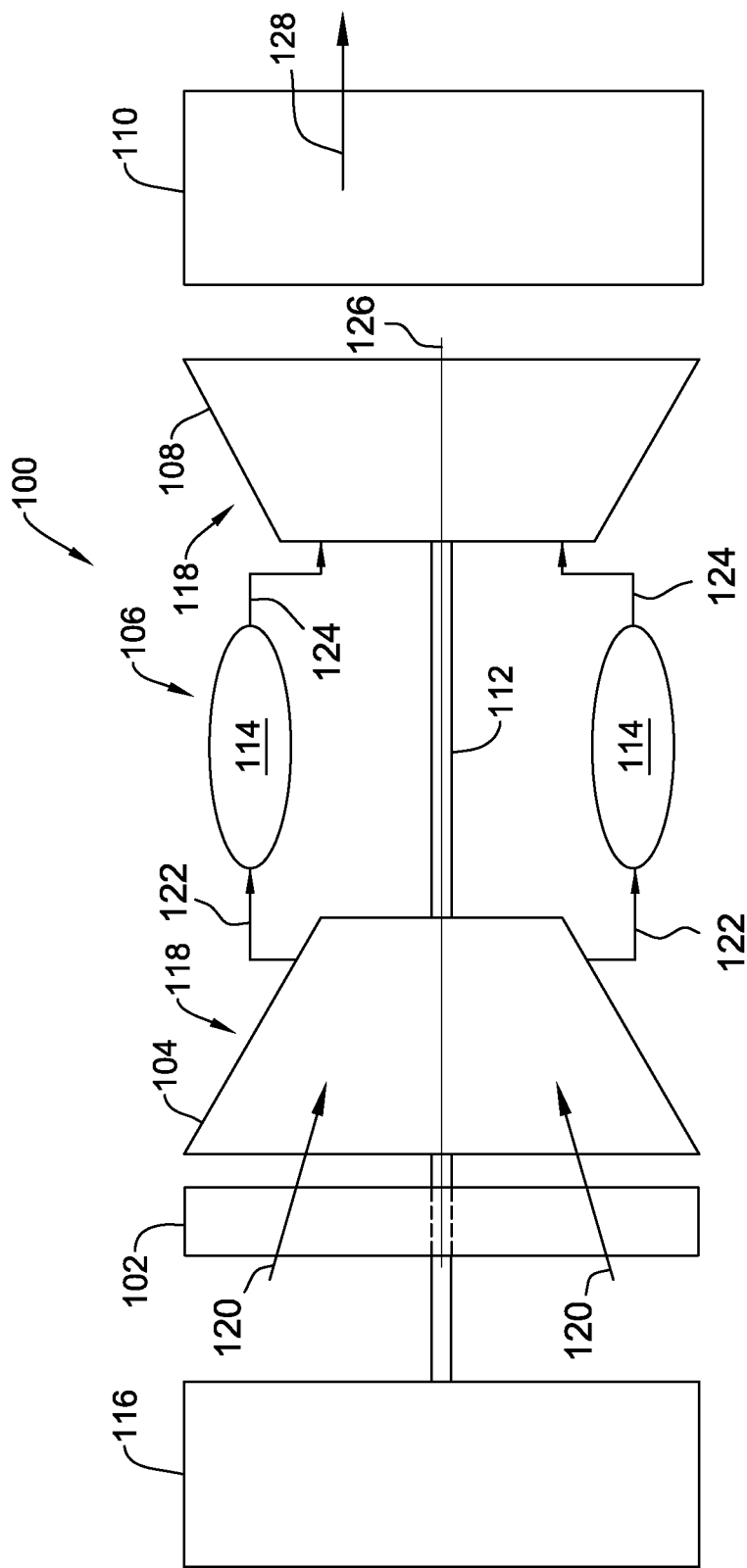
FIG. 1 is a schematic view if an exemplary rotary machine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

As used herein, the terms "axial" and "axially" refer to directions and orientations extending substantially parallel to a longitudinal axis of a rotary machine. Moreover, the terms "radial" and "radially" refer to directions and orientations extending substantially perpendicular to the longitudinal axis of the rotary machine. In addition, as used herein, the terms "circumferential" and "circumferentially" refer to directions and orientations extending arcuately about the longitudinal axis of the rotary machine. Further, as used herein, the term "upstream" refers to a forward or inlet end of a rotary machine, and the term "downstream" refers to an aft or exhaust end of the rotary machine.

The systems described herein relate to cooling components of a rotary machine using an insert system and methods of installing the same. Specifically, in the exemplary embodiment, the component includes an airfoil. The airfoil includes a plenum that extends into an aft portion of the airfoil and includes a plenum inlet opening. The plenum inlet opening is configured to receive a cooling fluid for internal cooling of the airfoil. An entirety of the plenum inlet opening is defined axially forward of the aft portion. The insert system includes a first insert and a second insert each having impingement openings defined therethrough. The first insert is insertable radially into the plenum through the plenum inlet and movable aftward within the plenum, such that a portion of the first insert extends aftwardly into the plenum towards the aft portion of the airfoil. The second insert is also insertable radially into the plenum through the plenum inlet and, when inserted, the second insert is positioned forward of the first insert in the installed position. The first and second inserts each have radially outward-facing inlet openings that, after installation, are positioned side-by-side in the plenum inlet. In operation, a first portion of the cooling fluid channeled to the plenum inlet of the airfoil is received through the inlet opening of the first insert, and a second portion of the cooling fluid channeled to the plenum inlet of the airfoil is received through the inlet opening of the second insert and into the cavity. The respective portions of the received cooling fluid are channeled through the impingement openings of the respective inserts, including the impingement openings of the first insert positioned with respect to the aft portion of the airfoil. Thus, the insert system facilitates effective impingement cooling of the portion of the airfoil that extends aft of the plenum inlet. Additionally, the insert system facilitates ease of installation into the airfoil and, in some embodiments, ease of removal from the airfoil for repair and replacement.

FIG. 1 is a schematic view of an exemplary rotary machine 100, i.e., a turbomachine, and more specifically a turbine engine. In the exemplary embodiment, rotary machine 100 is a gas turbine engine. Alternatively, rotary machine may be any other turbine engine and/or rotary machine, including, without limitation, a steam turbine engine, a gas turbofan aircraft engine, other aircraft engine, a wind turbine, a compressor, and a pump. In the exemplary embodiment, gas turbine engine 100 includes an intake section 102, a compressor section 104 that is coupled downstream from intake section 102, a combustor section 106 that is coupled downstream from compressor section 104, a turbine section 108 that is coupled downstream from combustor section 106, and an exhaust section 110 that is coupled downstream from turbine section 108. Turbine section 108 is coupled to compressor section 104 via a rotor shaft 112. It should be noted that, as used herein, the term "couple" is not limited to a direct mechanical, thermal, electrical, and/or flow communication connection between components, but may also include an indirect mechanical, thermal, electrical, and/or flow communication connection between multiple components. In the exemplary embodiment, combustor section 106 includes a plurality of combustors 114. Combustor section 106 is coupled to compressor section 104 such that each combustor 114 is in flow communication with the compressor section 104. Rotor shaft 112 is further coupled to a load 116 such as, but not limited to, an electrical generator and/or a mechanical drive application. In the exemplary embodiment, each of compressor section 104 and turbine section 108 includes at least one rotor assembly 118 that is coupled to rotor shaft 112.

In operation, intake section 102 channels air 120 towards compressor section 104. Compressor section 104 compresses inlet air 120 to higher pressures prior to discharging compressed air 122 towards combustor section 106. Compressed air 122 is channeled to combustor section 106 where it is mixed with fuel (not shown) and burned to generate high temperature combustion gases 124. Combustion gases 124 are channeled downstream towards turbine section 108 and impinge upon turbine blades (not shown), converting thermal energy to mechanical rotational energy that is used to drive rotor assembly 118 about a longitudinal axis 126. Often, combustor section 106 and turbine section 108 are referred to as a hot gas section of turbine engine 100. Exhaust gases 128 then discharge through exhaust section 110 to ambient atmosphere.

Figure 2:
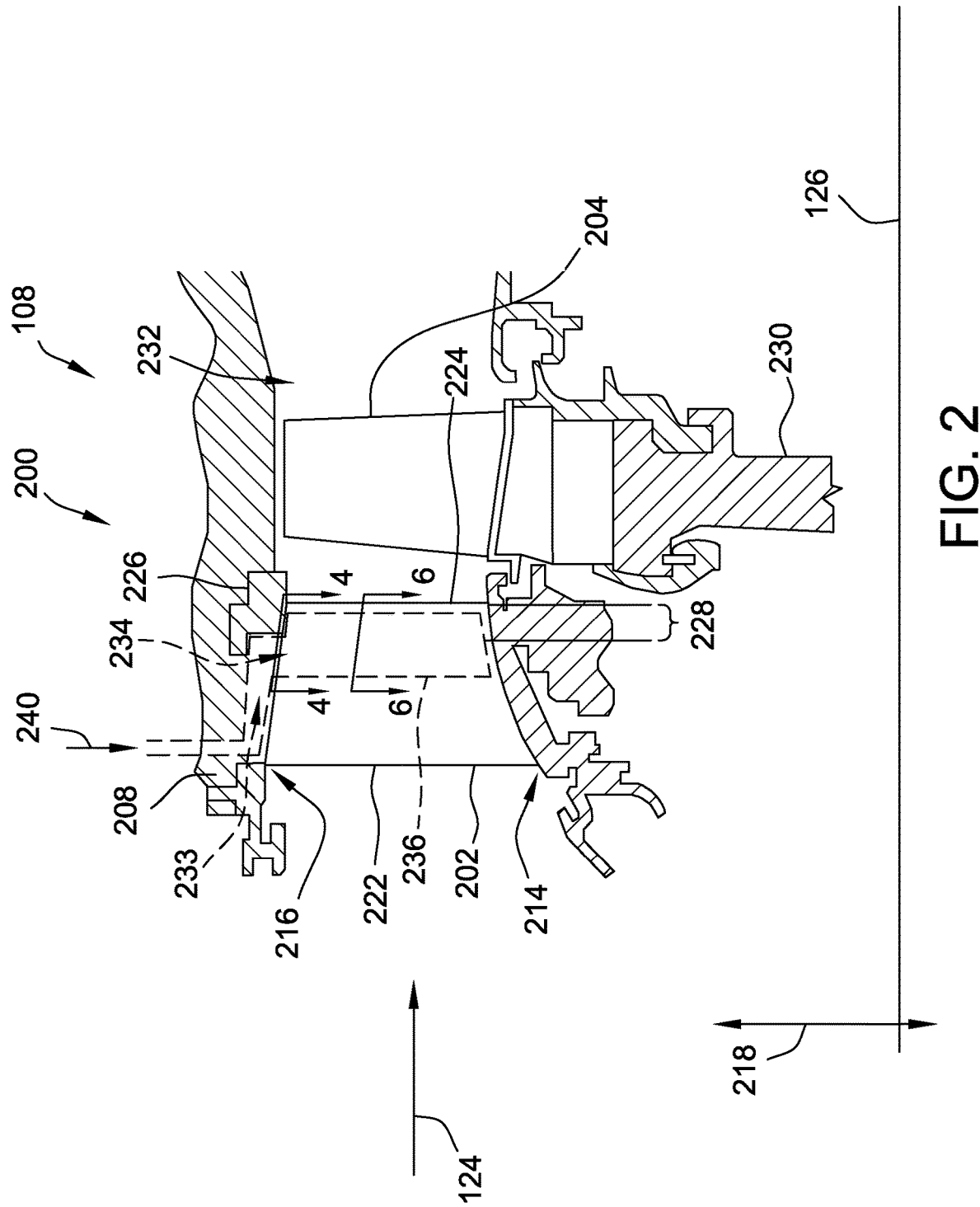
FIG. 2 is an enlarged schematic view of an exemplary turbine stage of the rotary machine shown in FIG. 1.

FIG. 2 is an enlarged schematic view of an exemplary turbine stage 200 of turbine engine 100 (shown in FIG. 1). Stage 200 includes a plurality of radially extending stationary airfoils 202 circumferentially spaced around longitudinal axis 126, and a plurality of radially extending rotating airfoils 204 downstream from stationary airfoils 202 and circumferentially spaced around longitudinal axis 126. Each rotating airfoil 204 is coupled to rotor shaft 112 (shown in FIG. 1) via a disk 230, and extends radially outward towards a casing 208.

In the exemplary embodiment, each stationary airfoil 202 includes a first end 216 coupled to casing 208 of turbine section 108, and extends radially inward to a second end 214 along a radial direction 218. For example, stationary airfoil 202 is coupled to casing 208 via an aft supporting flange or hanger 226. Additionally, each stationary airfoil 202 extends axially from a leading edge 222 downstream to an opposing trailing edge 224. During operation, stationary airfoils 202 and rotating airfoils 204 are positioned within a hot gas flow path 232, such that a flow of high temperature combustion gases 124 is channeled therethrough, exposing outer surfaces of stationary airfoils 202 and rotating airfoils 204 to high temperatures and potential corresponding thermal stresses and/or thermal degradation. To mitigate such thermal effects, an interior cavity or plenum 236 is defined within stationary airfoil 202, i.e., between a pressure side wall 210 and an opposite suction side wall 212 (shown in FIG. 4) of stationary airfoil 202, to facilitate internal impingement cooling of an interior surface of the outer walls. For example, plenum 236 is defined at least partially by interior surfaces of pressure side wall 210 and suction side wall 212 (shown in FIG. 4) of stationary airfoil 202. Plenum 236 is in flow communication with a coolant supply channel 233 via a plenum inlet 234 defined in stationary airfoil 202 at first end 216. In the exemplary embodiment, coolant supply channel 233 channels a cooling fluid 240, such as a flow of pressurized bleed air from compressor section 104 (shown in FIG. 1), towards plenum inlet 234. Alternatively, cooling fluid 240 is a suitable fluid other than air. The term fluid as used herein includes any medium or material that flows, including, but not limited to, air and steam.

In the exemplary embodiment, stage 200 is a first stage of turbine section 108, and stationary airfoils 202 define a first stage turbine nozzle immediately downstream from combustor section 106 (shown in FIG. 1). In alternative embodiments, stage 200 is any suitable stage of turbine section 108. In the exemplary embodiment, plenum 236 extends axially aftward into an aft portion 228 of stationary airfoil 202. An entirety of plenum inlet 234 is defined forward of aft portion 228, i.e., plenum inlet 234 does not extend axially over aft portion 228, which limits an ability of known systems to direct cooling fluid from coolant supply channel 233 for effective impingement on the interior surface of the outer walls of aft portion 228. For example, aft portion 228 extends for a substantial length, or "overhangs," directly beneath aft supporting flange 226, which precludes plenum inlet 234 from extending directly over aft portion 228. In some embodiments, such an overhang is required for stationary airfoils 202 to implement a desired turning angle in a first stage of turbine section 108.

Figure 3:
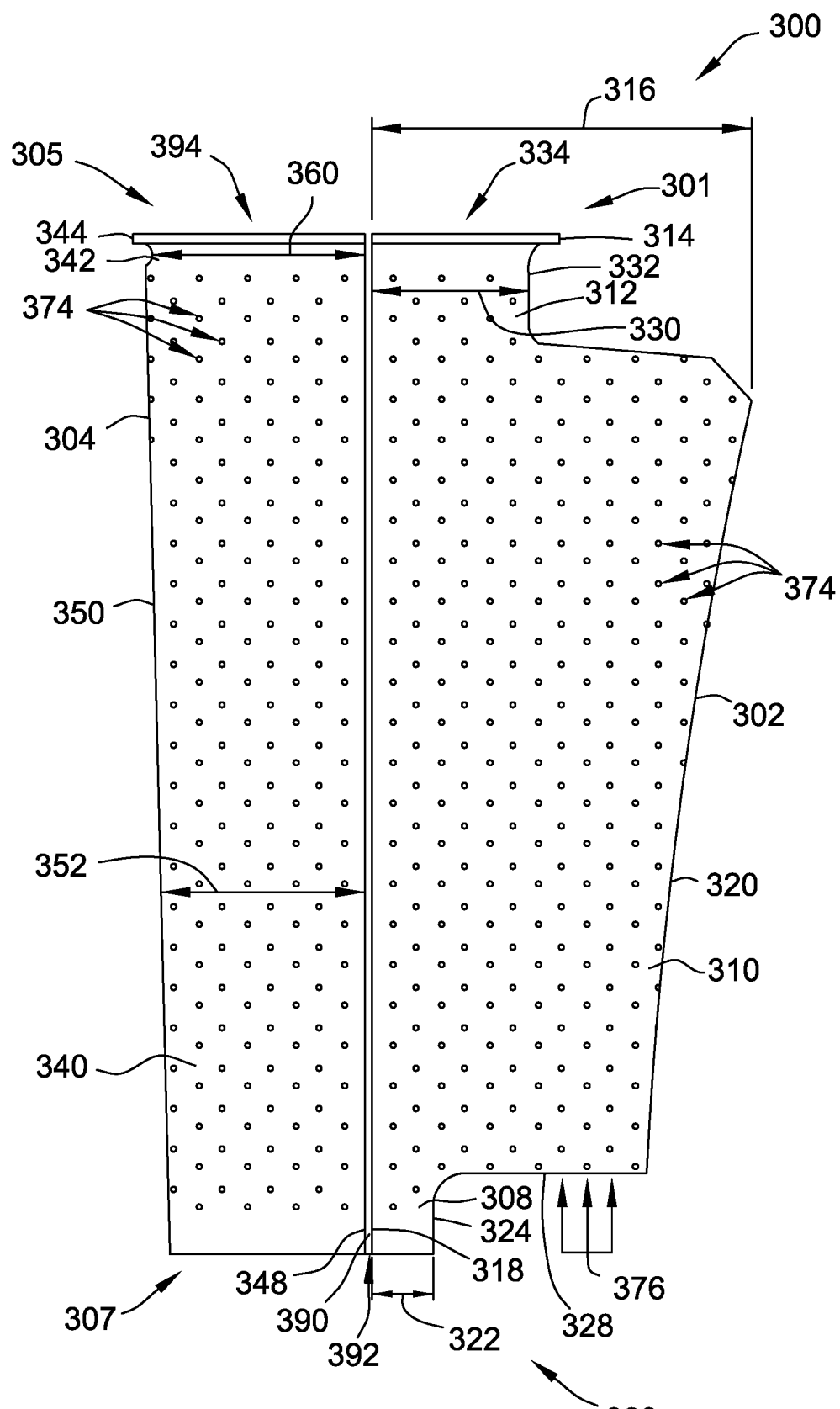
FIG. 3 is a side view of an exemplary insert system for use with a stationary airfoil of the turbine stage shown in FIG. 2.
Figure 4:
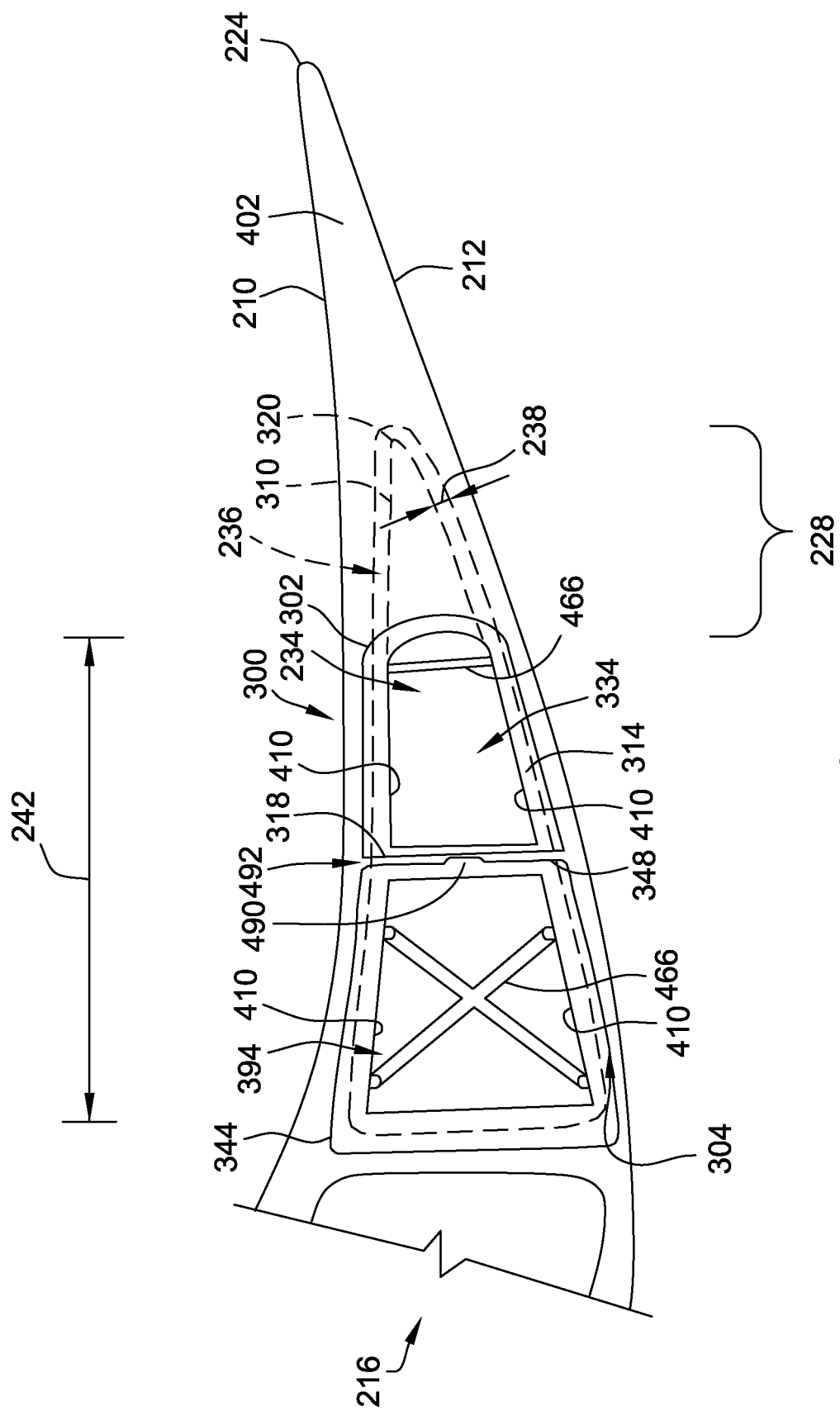
FIG. 4 is a cut-away view of an exemplary stationary airfoil having the insert system of FIG. 3 installed therein, taken along line 4-4 illustrated in FIG. 2.

FIG. 3 is a side view of an exemplary insert system 300 for use with stationary airfoil 202. FIG. 4 is a cut-away view of an exemplary stationary airfoil 202 having insert system 300 installed therein, taken along line 4-4 illustrated in FIG. 2, that is, at first end 216 of stationary airfoil 202. With reference to FIGS. 3 and 4, insert system 300 includes a first insert 302 and a second insert 304 sized to be inserted sequentially through plenum inlet 234 into plenum 236, and configured to be coupled in axial series within plenum 236. More specifically, first insert 302 is sized for insertion into plenum 236 radially through plenum inlet 234, and is then movable aftward within plenum 236 into an installed position in which a first neck portion 312 is positioned aftward in plenum inlet 234, and in which first insert 302 extends into aft portion 228 of stationary airfoil 202. Second insert 304 is sized for insertion into plenum 236 radially through plenum inlet 234 forward of first neck portion 312 in the installed position. In the exemplary embodiment, first insert 302 and second insert 304 each are thin-walled hollow bodies that include a plurality of impingement openings 374 defined therein and extending therethrough. In alternative embodiments, first insert 302 and second insert 304 have any suitable structure that enables impingement openings 374 to be defined therein. Impingement openings 374 are oriented to channel cooling fluid 240 supplied through plenum inlet 234 towards the interior surfaces of pressure side wall 210 and suction side wall 212 of stationary airfoil 202.

In the exemplary embodiment, first insert 302 extends from a first end 301 radially inward to a second end 303. First insert 302 includes first neck portion 312 adjacent first end 301, a foot portion 308 adjacent second end 303, and a first main body portion 310 extending radially therebetween. First main body portion 310 extends axially from a first forward wall 318 downstream to an aft edge 320 and defines a first insert axial length 316 therebetween. In the exemplary embodiment, first insert axial length 316 is less than a plenum inlet axial length 242 of plenum inlet 234, such that first insert 302 is insertable into, and subsequently removable from, plenum 236 radially through plenum inlet 234. In alternative embodiments, first insert axial length 316 is any suitable length that enables insert system 300 to function as described herein. Moreover, after insertion into plenum 236 through plenum inlet 234, first insert 302 is movable aftward within plenum 236 into the installed position such that first main body portion 310 extends into aft portion 228 of stationary airfoil 202. For example, in the illustrated embodiment, after insertion, first insert 302 is slidable aftward within plenum 236 into the installed position.

In the exemplary embodiment, foot portion 308 extends axially from first forward wall 318 downstream to an aft edge 324 and defines an axial length 322 therebetween that is less than first insert axial length 316. Similarly, first neck portion 312 extends axially from first forward wall 318 downstream to an aft edge 332 and defines a first neck axial length 330 therebetween that is less than first insert axial length 316. Moreover, first neck portion 312 defines a first insert inlet opening 334 at first end 301. First insert inlet opening 334 is configured to channel cooling fluid 240 from coolant supply channel 233 (shown in FIG. 2) into an interior of first insert 302.

In the exemplary embodiment, first neck portion 312, foot portion 308, and first main body portion 310 are shaped generally congruent to a shape of a corresponding first portion of plenum 236, such that impingement openings 374 defined in first insert 302 are spaced from the interior surfaces of pressure side wall 210 and suction side wall 212 by a predetermined impingement offset 238 when first insert 302 is in the installed position. In particular, in the installed position, first neck portion 312 is configured to align with, and receive cooling fluid 240 from, an aft portion of coolant supply channel 233 (shown in FIG. 2). Also in the installed position, first main body portion 310 extends aftward beyond first neck portion 312 into aft portion 228 of stationary airfoil 202, and is configured to channel cooling fluid 240 received through first neck portion 312 for effective impingement cooling of aft portion 228. Insert system 300 thus provides an advantage over known inserts for impingement cooling in channeling cooling fluid from plenum inlet 234 to aft portion 228, for example in embodiments in which aft portion 228 overhangs directly beneath aft supporting flange 226 (shown in FIG. 2).

In some embodiments, foot portion 308 facilitates positioning of first insert 302 with respect to plenum 236. For example, foot portion 308 may be configured to interfere with an internal surface (not shown) within stationary airfoil 202 such that further aft and/or radial movement of first insert 302 beyond the installed position is inhibited. In alternative embodiments, first insert 302 does not include foot portion 308. For example, second end 303 of first insert 302 is defined by a radially inner end 328 of first main body portion 310, such that second insert 304 extends radially inward to a greater extent than does first insert 302.

In the exemplary embodiment, second insert 304 extends from a first end 305 radially inward to a second end 307. Second insert 304 includes a second neck portion 342 adjacent first end 305, and a second main body portion 340 extending radially inward from second neck portion 342 to second end 307. Second main body portion 340 extends axially from an aft wall 348 upstream to a second forward wall 350 and defines a second insert axial length 352 therebetween. In the exemplary embodiment, second insert axial length 352 is less than a difference between plenum inlet axial length 242 and first neck axial length 330, such that after first insert 302 is shifted into the installed position, in which with first neck portion 312 is positioned aftward in plenum inlet 234, second insert 304 is insertable into, and subsequently removable from, plenum 236 radially through plenum inlet 234 forward of first neck portion 312. In alternative embodiments, second insert axial length 352 is any suitable length that enables insert system 300 to function as described herein.

Second neck portion 342 extends axially from aft wall 348 upstream to second forward wall 350 and defines an axial length 360 therebetween. In the exemplary embodiment, axial length 360 is less than second insert axial length 352. In alternative embodiments, axial length 360 is any suitable length that enables insert system 300 to function as described herein. Second neck portion 342 defines a second insert inlet opening 394 at first end 305. Second neck portion 342 is configured to be positioned in plenum inlet 234, forward of first neck portion 312 in the installed position. Second insert inlet opening 394 is configured to channel cooling fluid 240 from a forward portion of coolant supply channel 233 (shown in FIG. 2) into an interior of second insert 304.

In the exemplary embodiment, second neck portion 342 and second main body portion 340 are shaped generally congruent to a shape of a corresponding second portion of plenum 236, such that impingement openings 374 defined in second insert 304 are again spaced from the interior surfaces of pressure side wall 210 and suction side wall 212 by predetermined impingement offset 238. In particular, second neck portion 342 is configured to align with, and receive cooling fluid 240 from, a forward portion of coolant supply channel 233 (shown in FIG. 2).

In the exemplary embodiment, impingement openings 374 are arranged over portions of first insert 302 and second insert 304 that face pressure side wall 210 and suction side wall 212. For example, impingement openings 374 are arranged in radially extending columns 376, and impingement openings in each column 376 are radially offset, or "staggered," from impingement openings 374 in adjacent columns 376. In alternative embodiments, impingement openings 374 are arranged in any suitable fashion that enables insert system 300 to function as described herein.

In the exemplary embodiment, stationary airfoil 202 further includes a radially outer wall 402 defined between pressure side wall 210 and suction side wall 212 at first end 216, such that plenum inlet 234 is defined in radially outer wall 402 and extends therethrough. Moreover, first insert 302 includes a first flange 314 configured to interface with radially outer wall 402. In the exemplary embodiment, first flange 314 extends outwardly from a perimeter of first insert inlet opening 334, transversely to radial direction 218. For example, in the illustrated embodiment, first flange 314 extends from all portions of a perimeter of first insert inlet opening 334 excepting a portion of first insert inlet opening 334 defined by first forward wall 318. First flange 314 is configured to abut radially outer wall 402 when first insert 302 is properly positioned within plenum 236. Thus, first flange 314 facilitates installation of first insert 302. In alternative embodiments, first insert 302 does not include first flange 314.

Similarly, in the exemplary embodiment, second insert 304 includes a second flange 344 configured to interface with radially outer wall 402. In the exemplary embodiment, second flange 344 extends outwardly from a perimeter of second insert inlet opening 394, transversely to radial direction 218. For example, in the illustrated embodiment, second flange 344 extends from all portions of a perimeter of second insert inlet opening 394 excepting a portion defined by aft wall 348. Second flange 344 is configured to abut radially outer wall 402 when second insert 304 is properly positioned within plenum 236. Thus, second flange 344 facilitates installation of second insert 304. In alternative embodiments, second insert 304 does not include second flange 344.

In some embodiments, after insert system 300 is in the installed configuration, a gap 392 is defined between aft wall 348 of second insert 304 and first forward wall 318 of first insert 302. In the exemplary embodiment, insert system 300 includes a sealing mechanism 390 extending between aft wall 348 and first forward wall 318 and configured to seal gap 392 against cross-flow within plenum 236 between pressure side wall 210 and suction side wall 212. For example, sealing mechanism 390 includes at least one radially extending ridge or lip affixed to one of aft wall 348 and first forward wall 318. The ridge or lip protrudes axially into abutment with the other of aft wall 348 and first forward wall 318. For another example, sealing mechanism 390 includes at least one radially extending resilient member compressed between aft wall 348 and first forward wall 318. In alternative embodiments, insert system 300 does not include sealing mechanism 390. For example, aft wall 348 directly abuts first forward wall 318 after second insert 304 is installed.

In the exemplary embodiment, first insert 302 and second insert 304 each include at least one support member 466 spanning an interior cavity of the insert. For example, each support member 466 includes at least one elongated rod or beam configured to provide structural support to the thin-walled hollow structure. In the exemplary embodiment, each support member 466 extends between opposing lateral sides 410 of the corresponding insert 302 or 304. For example, in the illustrated embodiment, first insert 302 includes a pair of support members 466 each including a single beam, positioned respectively at about 33 percent and about 67 percent of an axial length of first insert 302. For another example, in the illustrated embodiment, second insert 304 includes four support members 466 each including a pair of beams joined centrally in an "X" shape, positioned respectively at about 20 percent, about 40 percent, about 60 percent, and about 80 percent of an axial length of second insert 304. In alternative embodiments, each of first insert 302 and second insert 304 includes any suitable number of support members 466, and/or each support member 466 has any suitable shape and position, that enables first insert 302 and second insert 304 to function as described herein. In other alternative embodiments, at least one of first insert 302 and second insert 304 does not include any support members 466.

Figure 5:
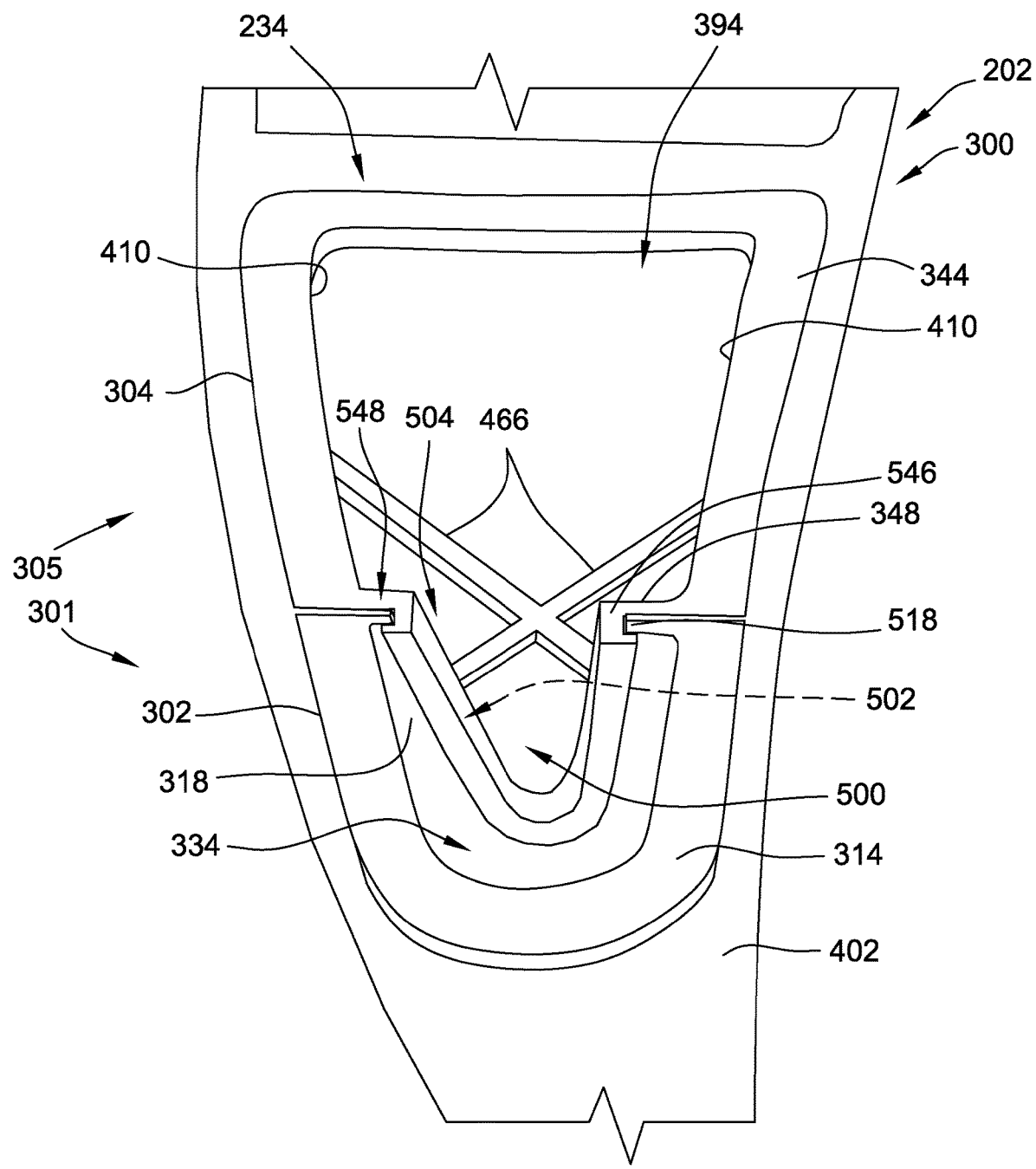
FIG. 5 is a perspective view of another exemplary embodiment of the insert system installed in a stationary airfoil of the turbine stage shown in FIG. 2.

FIG. 5 is a perspective view of another exemplary embodiment of insert system 300 installed in stationary airfoil 202. The embodiment illustrated in FIG. 5 is substantially similar to the embodiment illustrated in FIGS. 3 and 4, except as described below, and like parts are numbered identically. In certain embodiments, a size of first insert inlet opening 334 does not, by itself, enable sufficient flow of cooling fluid 240 (shown in FIG. 2) into first insert 302. In such embodiments, insert system 300 further includes a bypass opening or passage 500 defined in and extending through aft wall 348 and first forward wall 318, such that a portion of cooling fluid 240 received through second insert inlet opening 394 is channeled into first insert 302 to supplement cooling fluid 240 received via first insert inlet opening 334. In some embodiments, sealing mechanism 390 (shown in FIG. 3) extends radially between aft wall 348 and first forward wall 318, as described above, at locations other than bypass opening 500.

For example, in the embodiment illustrated in FIG. 5, bypass opening 500 is defined by a first notch 502 defined in first forward wall 318 and a second notch 504 defined in aft wall 348 such that second notch 504 registers with first notch 502 when insert system 300 is installed. In the exemplary embodiment, first notch 502 and second notch 504 are generally V-shaped and open from first end 301 of first insert 302 and first end 305 of second insert 304, respectively. In alternative embodiments, bypass opening 500 has any suitable shape and/or is defined at any suitable registered locations in aft wall 348 and first forward wall 318.

In some embodiments, aft wall 348 and first forward wall 318 are configured to interface to couple together first insert 302 and second insert 304 along a perimeter of bypass opening 500. For example, in the exemplary embodiment, first forward wall 318 defines an edge 518 around first notch 502, and second insert 304 includes a lip 546 protruding aftward from aft wall 348 around second notch 504. Lip 546 and aft wall 348 cooperate to define a groove 548 sized to slidably receive edge 518 when second insert 304 is inserted in the radial direction through plenum inlet 234 into position adjacent to first insert 302. Groove 548 and edge 518 interface to secure first insert 302 relative to second insert 304 along the perimeter of bypass opening 500. In alternative embodiments, aft wall 348 and first forward wall 318 are configured to interface in any suitable fashion that enables insert system 300 to function as described herein. In other alternative embodiments, aft wall 348 and first forward wall 318 are not configured to interface.

Figure 6:
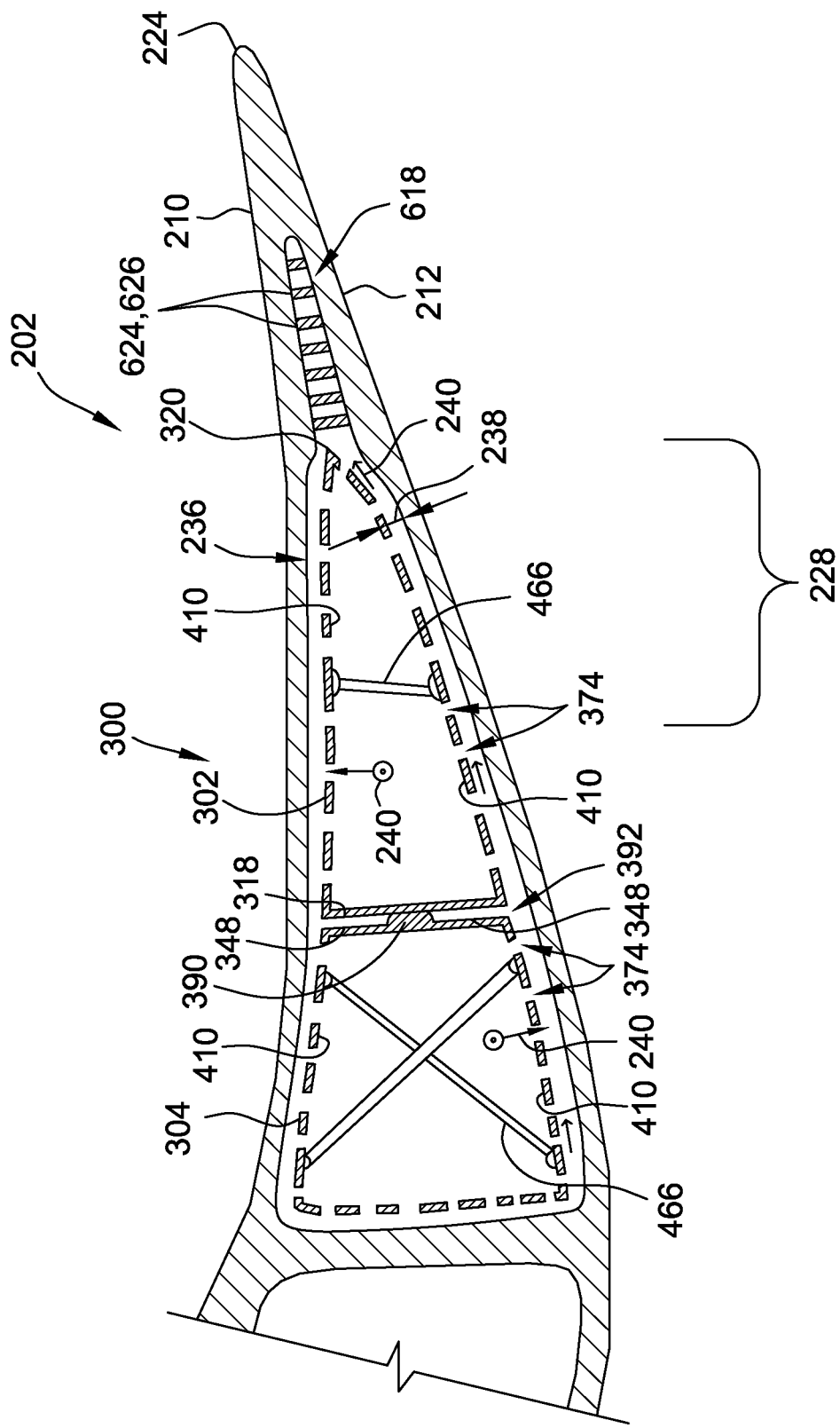
FIG. 6 is a cross-sectional view of a portion of an exemplary stationary airfoil having the insert system of FIG. 3 installed therein, taken along line 6-6 illustrated in FIG. 2.

FIG. 6 is a cross-sectional view of stationary airfoil 202 having insert system 300 installed therein, taken along line 6-6 illustrated in FIG. 2, that is, at a central span location along stationary airfoil 202. The embodiment illustrated in FIG. 6 is substantially similar to the embodiment illustrated in FIGS. 3 and 4, and like parts are numbered identically. In the exemplary embodiment, as pressure side wall 210 and suction side wall 212 taper towards each other to couple together at trailing edge 224, there is insufficient space for first insert 302 to extend aftward within plenum 236. More specifically, plenum 236 includes an aft plenum portion 618 located axially between first insert 302 and trailing edge 224.

In operation, cooling fluid 240 (shown in FIG. 2) is channeled into first insert 302 and second insert 304, and through the plurality of impingement openings 374 into impingement on the respective interior surface of pressure side wall 210 and suction side wall 212. Post-impingement, at least a portion of the flow of cooling fluid 240 is channeled aftward to aft plenum portion 618.

In the exemplary embodiment, stationary airfoil 202 includes an aft pin bank 624. Aft pin bank 624 includes a plurality of pins 626 extending between pressure side wall 210 and suction side wall 212 through aft plenum portion 618. In the exemplary embodiment, pins 626 are distributed radially along aft plenum portion 618, as well as axially, and facilitate heat exchange between post-impingement cooling fluid 240 and pressure side wall 210 and suction side wall 212 proximate to trailing edge 224. In alternative embodiments, pins 626 are distributed in any suitable fashion that enables stationary airfoil 202 to function as described herein. In other alternative embodiments, stationary airfoil 202 does not include aft pin bank 624. In the exemplary embodiment, post-impingement cooling fluid 240 is exhausted from stationary airfoil 202 through exit openings (not shown) along trailing edge 224. In alternative embodiments, post-impingement cooling fluid 240 is channeled to any other suitable location in any suitable fashion that enables stationary airfoil 202 to function as described herein.

Figure 7:
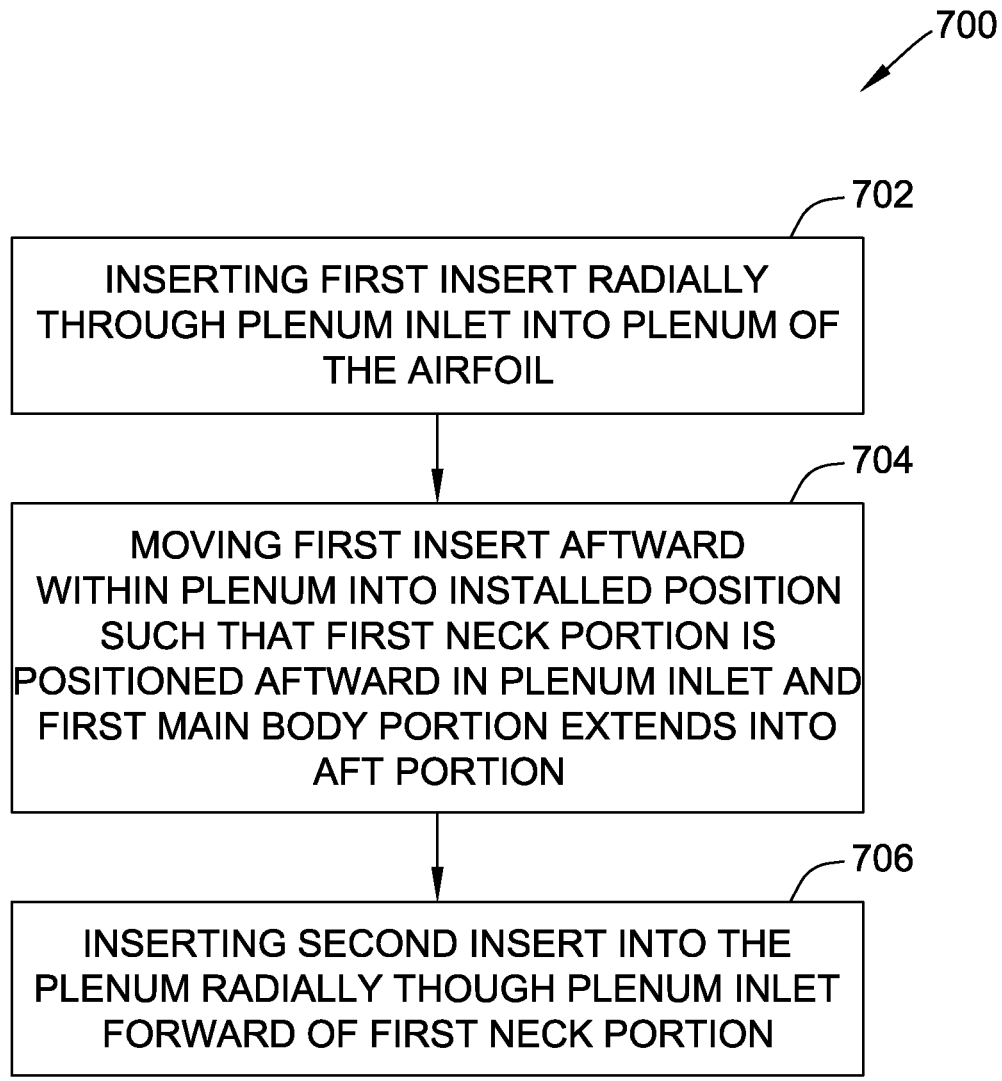
FIG. 7 is a flow diagram of an exemplary method of installing the insert system of FIG. 3 or FIG. 5.

FIG. 7 is a flow diagram of an exemplary method 700 of installing an insert system, such as insert system 300, into an airfoil, such as airfoil 202 (shown in FIGS. 2-5). The airfoil includes a plenum, such as plenum 236, that extends into an aft portion, such as aft portion 228, of the airfoil. The plenum includes a plenum inlet, such as plenum inlet 234, and the entirety of the plenum inlet is defined axially forward of the aft portion. In the exemplary embodiment, method 700 includes inserting 702 a first insert, such as first insert 302, radially through the plenum inlet into the plenum. The first insert includes a first neck portion, such as first neck portion 312, and a first main body portion, such as first main body portion 310. Method 700 also includes moving 704 the first insert aftward within the plenum into an installed position such that the first neck portion is positioned aftward in the plenum inlet and the first main body portion extends into the aft portion. Method 700 further includes inserting 706 a second insert, such as second insert 304, into the plenum radially through the plenum inlet forward of the first neck portion. The first insert and second insert include a plurality of impingement openings, such as impingement openings 374, defined therein.

In some embodiments, method 700 further includes positioning a second neck portion, such as second neck portion 342, of the second insert in the plenum inlet forward of the first neck portion.

In certain embodiments, the airfoil includes a radially outer wall, such as radially outer wall 402, and the plenum inlet is defined in the radially outer wall, the first neck portion includes a first insert inlet opening, such as first insert inlet opening 334, and the first insert further includes a first flange, such as first flange 314, extending outwardly from a perimeter of the first insert inlet opening. In some such embodiments, method 700 further includes interfacing the first flange with the radially outer wall of the airfoil.

In some embodiments, the first insert further includes a first forward wall, such as first forward wall 318, and the second insert further includes an aft wall, such as aft wall 348. In some such embodiments, method 700 further includes positioning a sealing mechanism, such as sealing mechanism 390, between the aft wall and the first forward wall.

In some embodiments, the first insert further includes a first forward wall having a first notch, such as first notch 502, defined therein, and the second insert further includes an aft wall having a second notch, such as second notch 504, defined therein. In some such embodiments, inserting 706 the second insert into the plenum further includes registering the second notch with the first notch.

The above described insert system for insertion through an opening in a plenum facilitates effective impingement cooling of an aft portion of an airfoil, thus decreasing the degradation associated with continual high-temperature exposure of the aft portion and increasing the longevity of the airfoil. The insert system may be particularly advantageous in airfoils in which an aft portion of the airfoil overhangs directly beneath an airfoil supporting flange, such as airfoils with a larger turning section towards the aft end. The two-insert system allows for an impingement insert to be inserted through the pre-existing plenum opening of the airfoil and then moved aft into an overhung portion of the airfoil in a simple process, allowing this aft portion to receive more effective impingement cooling. Absent the insert system of the present disclosure, an insert configuration could be substantially limited by the dimensions of the opening in the plenum.

Additionally, in particular embodiments disclosed herein, the two inserts may be supplied from a single cooling fluid supply channel at a single pressure. As such, in these embodiments, the two inserts have a substantially uniform inlet pressure which can, for example, allow more effective and consistent impingement cooling of surfaces proximal to both inserts. It can also decrease the need to configure other components of the rotary machine to supply cooling fluid separately into the two different inserts. Further, in some embodiments, the inert system is removable in a simple process, facilitating ease of repair and replacement.

Additionally, an exemplary technical effect of the systems and methods described herein includes at least one of: (a) removing heat from a rotary machine component that includes an airfoil; (b) maintaining a consistent temperature gradient with the airfoil to improve component efficiency; (c) reduce amount of cooling fluids extracted from a compressor; (d) increase the coolant stream efficiency within a component region that is traditionally difficult to cool; and (e) increase rotary machine efficiency.

Exemplary embodiments of systems and methods for cooling an airfoil of a rotary machine are described above in detail. The methods and systems are not limited to the specific embodiments described herein, but rather, components of systems and/or steps of the methods may be utilized independently and separately from other components and/or steps described herein. For example, the method may also be used in combination with other turbine components, and are not limited to practice only with the gas turbine engine stationary airfoils as described herein. Rather, the exemplary embodiment can be implemented and utilized in connection with many other rotary machine applications.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An insert system for an airfoil, wherein the airfoil includes a plenum that extends into an aft portion of the airfoil, wherein the plenum includes a plenum inlet, and wherein an entirety of the plenum inlet is defined axially forward of the aft portion, said insert system comprising:
    a first insert comprising a first neck portion, said first insert sized for insertion into the plenum radially through the plenum inlet, wherein said first insert is movable aftward within the plenum into an installed position such that said first neck portion is positioned aftward in the plenum inlet; and
    a second insert sized for insertion into the plenum radially through the plenum inlet forward of said first neck portion in the installed position, wherein said first insert and said second insert comprise a plurality of impingement openings defined therein.

2. The insert system of claim 1, wherein said second insert comprises a second neck portion configured to be positioned in the plenum inlet forward of said first neck portion in the installed position.

3. The insert system of claim 1, wherein the airfoil includes a radially outer wall and the plenum inlet is defined in the radially outer wall, wherein said first neck portion comprises a first insert inlet opening, and wherein said first insert further comprises a first flange extending outwardly from a perimeter of said first insert inlet opening and configured to interface with the radially outer wall of the airfoil.

4. The insert system of claim 1, wherein said first insert further comprises a first forward wall and said second insert further comprises an aft wall, said insert system further comprising a sealing mechanism extending between said aft wall and said first forward wall.

5. The insert system of claim 1, wherein at least one of said first insert and said second insert includes at least one support member spanning an interior cavity of said at least one of said first insert and said second insert.

6. The insert system of claim 1, wherein said first insert further comprises a first forward wall and said second insert further comprises an aft wall, and wherein a bypass opening is defined in and extends through said aft wall and said first forward wall.

7. A gas turbine system comprising:
    a compressor section;
    a combustion system coupled in flow communication with said compressor section; and
    a turbine section coupled in flow communication with said combustion system, wherein said turbine section comprises:
    an airfoil comprising a plenum that extends into an aft portion of said airfoil, wherein said plenum includes a plenum inlet, and wherein an entirety of said plenum inlet is defined axially forward of said aft portion;
    a first insert positioned within said plenum, said first insert comprising a first main body portion extending into said aft portion and a first neck portion positioned aftward in said plenum inlet; and a second insert positioned within said plenum forward of said first insert, said second insert comprising a second neck portion positioned in said plenum inlet forward of said first neck portion, wherein said first insert and said second insert comprise a plurality of impingement openings defined therein.

8. The gas turbine system of claim 7, wherein said airfoil further comprises a radially outer wall and said plenum inlet is defined in said radially outer wall, wherein said first neck portion comprises a first insert inlet opening, and wherein said first insert further comprises a first flange extending outwardly from a perimeter of said first insert inlet opening and configured to interface with said radially outer wall.

9. The gas turbine system of claim 7, wherein said first insert further comprises a first forward wall and said second insert further comprises an aft wall, said gas turbine system further comprising a sealing mechanism extending between said aft wall and said first forward wall.

10. The gas turbine system of claim 7, wherein said first insert further comprises a first forward wall and said second insert further comprises an aft wall, and wherein a bypass opening is defined in and extends through said aft wall and said first forward wall.

11. The gas turbine system of claim 7, wherein said gas turbine system further comprises a casing and an aft supporting flange coupled between said casing and said airfoil, and wherein said aft portion extends directly beneath said aft supporting flange.

12. The gas turbine system of claim 7, wherein said gas turbine system is configured to channel a flow of pressurized bleed air from said compressor section to said plenum inlet.

13. The gas turbine system of claim 7, wherein said plenum inlet defines a plenum inlet axial length, and said first insert defines a first insert axial length that is less than said plenum inlet axial length.

14. The gas turbine system of claim 13, wherein said first neck portion defines a first neck axial length, and said second insert defines a second insert axial length that is less than a difference between said plenum inlet axial length and said first neck axial length.

15. The gas turbine system of claim 7, wherein said airfoil further comprises a trailing edge and an aft pin bank, and said plenum comprises an aft plenum portion located axially between said first insert and said trailing edge, wherein said aft pin bank comprises a plurality of pins extending through said aft plenum portion.

16. A method of installing an insert system into an airfoil, wherein the airfoil includes a plenum that extends into an aft portion of the airfoil, wherein the plenum includes a plenum inlet, and wherein an entirety of the plenum inlet is defined axially forward of the aft portion, said method comprising:

inserting a first insert radially through the plenum inlet into the plenum, wherein the first insert includes a first neck portion and a first main body portion;

moving the first insert aftward within the plenum into an installed position such that the first neck portion is positioned aftward in the plenum inlet and the first main body portion extends into the aft portion; and inserting a second insert into the plenum radially through the plenum inlet forward of the first neck portion, wherein the first insert and the second insert include a plurality of impingement openings defined therein.

17. The method of claim 16, further comprising positioning a second neck portion of the second insert in the plenum inlet forward of the first neck portion.

18. The method of claim 16, wherein the airfoil includes a radially outer wall and the plenum inlet is defined in the radially outer wall, wherein the first neck portion includes a first insert inlet opening, and wherein the first insert further includes a first flange extending outwardly from a perimeter of the first insert inlet opening, said method further comprising interfacing the first flange with the radially outer wall of the airfoil.

19. The method of claim 16, wherein the first insert further includes a first forward wall and the second insert further includes an aft wall, said method further comprising positioning a sealing mechanism between the aft wall and the first forward wall.

20. The method of claim 16, wherein the first insert further includes a first forward wall having a first notch defined therein, and the second insert further includes an aft wall having a second notch defined therein, said inserting the second insert into the plenum further comprises registering the second notch with the first notch.

* * * * *